G. G. FRYER & E. PFLEIDERER.
LOCOMOTOR FOR USE IN CONDUITS.
APPLICATION FILED AUG. 11, 1906.

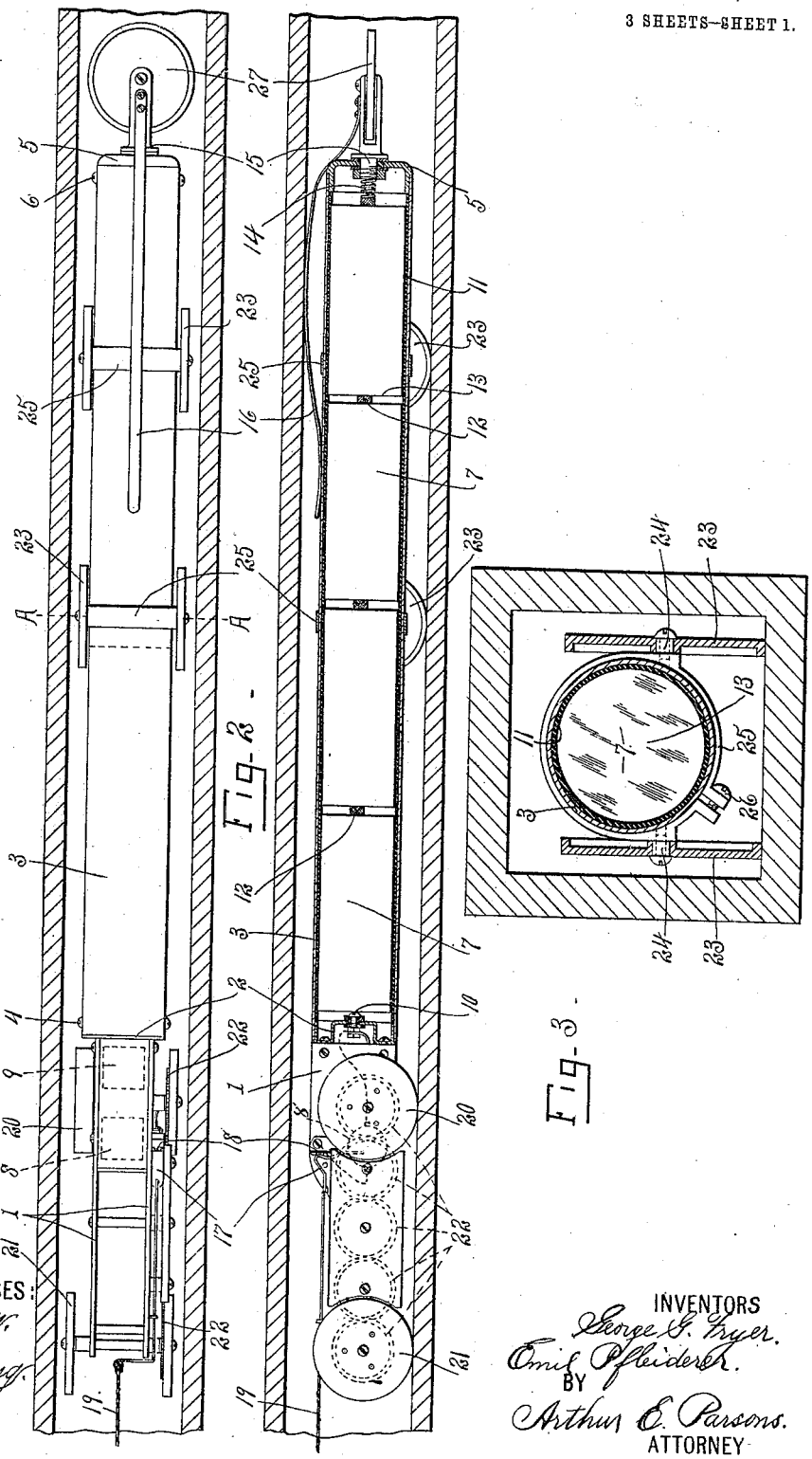

976,162.

Patented Nov. 22, 1910.

3 SHEETS—SHEET 2.

WITNESSES
Chas. J. Toner.
Chas. H. Young.

INVENTORS
George G. Fryer.
Emil Pfleiderer.
BY
Arthur C. Parsons
ATTORNEY

G. G. FRYER & E. PFLEIDERER.
LOCOMOTOR FOR USE IN CONDUITS.
APPLICATION FILED AUG. 11, 1906.

976,162.

Patented Nov. 22, 1910.
3 SHEETS—SHEET 3.

WITNESSES:
Chas. J. Toner.
Chas. H. Young.

INVENTORS
George G. Fryer.
Emil Pfleiderer.
BY
Arthur E. Parsons
ATTORNEY

UNITED STATES PATENT OFFICE.

GEORGE G. FRYER AND EMIL PFLEIDERER, OF SYRACUSE, NEW YORK.

LOCOMOTOR FOR USE IN CONDUITS.

976,162. Specification of Letters Patent. Patented Nov. 22, 1910.

Application filed August 11, 1906. Serial No. 330,143.

*To all whom it may concern:*

Be it known that we, GEORGE G. FRYER, and EMIL PFLEIDERER, of Syracuse, in the county of Onondaga and State of New York, have invented a certain new and useful Locomotor for Use in Conduits, of which the following is a specification.

Our invention has for its object the production of a locomotor for use in conduits, which is particularly simple in construction and highly efficient and durable in use; and to this end it consists in the novel combinations and constructions hereinafter set forth and claimed.

In describing this invention, reference is had to the accompanying drawing in which like characters designate corresponding parts in all the views.

Figure 4:
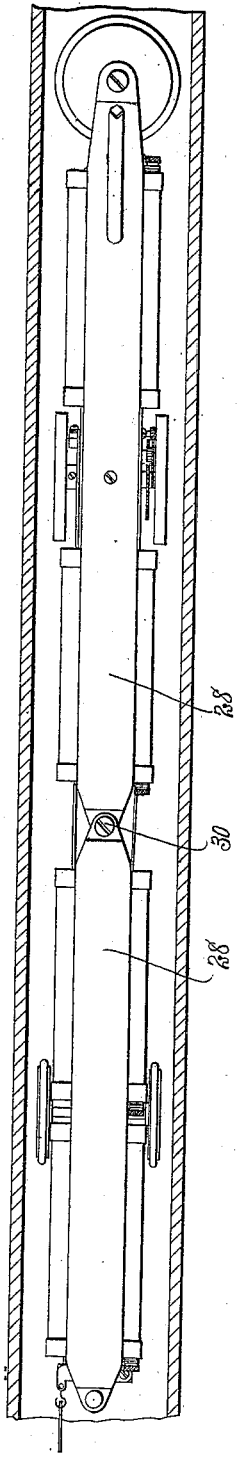
Figure 5:
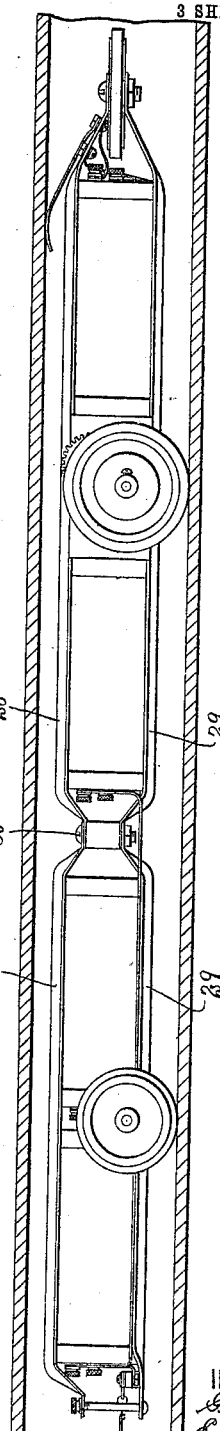
Figure 6:
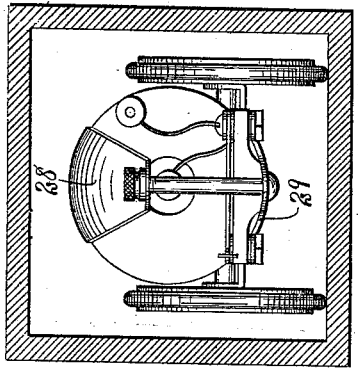
Figure 7:
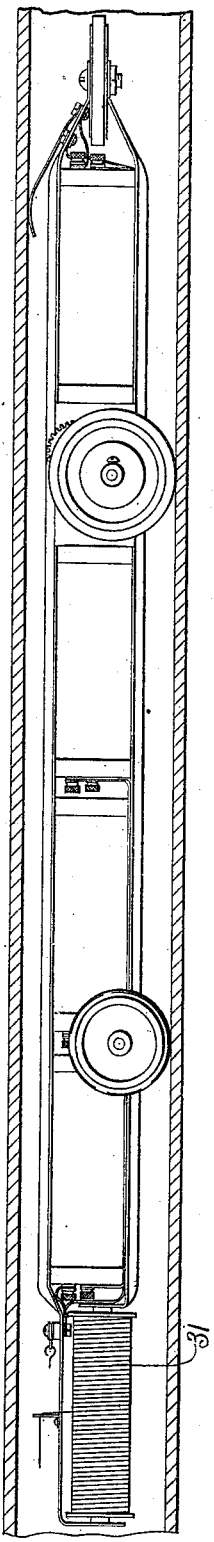
Figure 8:
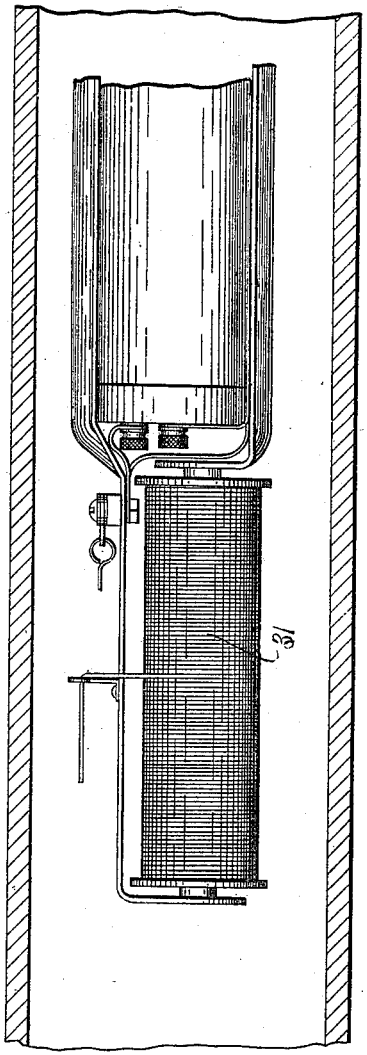

Figure 1 is a plan of one embodiment of our invention and a portion of a conduit, the latter being shown in section. Fig. 2 is an elevation, partly in section, of the means illustrated in the preceding figure. Fig. 3 is an enlarged sectional view on line A—A, Fig. 1. Figs. 4 and 5 are views similar to Figs. 1 and 2, showing another embodiment of our invention. Fig. 6 is a rear elevation of parts seen in Figs. 4 and 5. Fig. 7 is a view similar to Fig. 5, showing a further embodiment of our invention. Fig. 8 is an enlarged view of parts seen in Fig. 7.

The frame of our locomotor preferably consists of electric conducting substance, as metal, and includes a member 1 having a transverse wall 2, and a tubular cylindrical member 3 having one end detachably secured by suitable fastening means 4 to the member 1, and its other end provided with a detachable closure 5 adjustable rectilinearly toward and from the wall 2 and secured in position by fastening means 6. Although the described construction of frame is particularly applicable for use with the remaining parts of our invention, it will be apparent to those skilled in the art that any other suitable frame may be substituted therefor.

Our locomotor comprises a suitable motor and a source of electric energy, as batteries 7. The motor is of any desirable form, size and construction, including an armature 8 and a field-magnet 9, and as here illustrated, it is supported by the frame-member 1 at one end of the frame of the locomotor. The opposite poles of the motor are respectively connected to the electric conducting frame of the locomotor, and to a terminal 10 supported by the transverse wall 2 and electrically disconnected therefrom. The construction of the motor forms no part of the present invention, and further description thereof is deemed unnecessary.

The batteries 7 are arranged within the tubular frame-member 3, one in advance of the other, and are separated from the inner face of such frame-member by a sleeve 11 of insulation. The outer shells of the batteries are formed of suitable metal, and the carbon or positive terminal 12 at the end of each battery is in electrical contact with the metallic end or negative terminal 13 of the adjacent battery, thus electrically connecting the batteries, the terminals of which are located at opposite ends thereof.

The metallic end of one end battery is in contact with the terminal 10, and the carbon terminal of the other end battery is engaged by a yielding part, as a spring 14, forming the engaging end of a terminal 15 which is supported by the closure 5 and is electrically disconnected therefrom. The terminal 10 thus forms a fixed abutment for the batteries, and the terminal 15 serves to hold the batteries from movement relatively to the frame of the locomotor, and also serves as a part of the electrical connection between said batteries and the field-magnet 9 of the motor.

In the preferable construction of our invention, the closure 5 also supports a switch-member 16 which forms an electric connection between the terminal 15 and the conducting frame of the locomotor, this member being here shown as a bow-shaped spring having its advance end fixed to the terminal 15, and its rear end movable into and out of engagement with the frame-member 3. When the locomotor is within the conduit, the central curved portion of the member 16 is engaged by the inner face of the wall of the conduit, and the free end of said member is firmly held against the frame-member 3. As soon as the locomotor emerges from the conduit, the member 16 assumes its normal position, whereupon the free rear end thereof automatically separates from the frame-member 3, thus breaking the circuit and preventing further travel of the locomotor.

Our locomotor is generally provided with a switch-member 17 for facilitating control of the travel thereof, this member forming a part of the electric circuit to the field-magnet 9 from the batteries, and having one end supported in any desired manner and its other end movable and normally engaged with a terminal 18. A movable connection comprising a cord 19 is attached to the movable end of the member 17, and by means of this cord said switch-member may be separated from the terminal 18, thus breaking the circuit and stopping the travel of the locomotor. The cord 19 may also be utilized to draw a heavier cord or a wire through the conduit to facilitate laying the cable, or for withdrawing the locomotor partially or entirely from the conduit.

We preferably provide this locomotor with driving wheels, supporting wheels and a guide-wheel. In the illustrated construction of the invention, a plurality of driving wheels 20 21 are arranged one in advance of the other, in the direction of movement of the locomotor. The front driving wheels 20 are suitably connected to the armature 8 by power-transmitting means unnecessary to describe herein, and the rear driving wheels 21 are connected to the wheels 20 by gears 22, or other power-transmitting means. The supporting wheels 23 are mounted on trunnions 24 provided on split rings 25 which encircle the cylindrical frame-member 3, are adjustable toward and from each other, and are held in their adjusted position by clamping means, as screws 26, for drawing together the ends of the split rings 25. The guide-wheel 27 is preferably arranged in a horizontal plane and is carried by the closure 5.

In Figs. 4, 5, 6, 7 and 8 we have illustrated two other embodiments of our invention, Figs. 4, 5 and 6 showing a frame consisting of upper and lower strips 28 29 hollowed to conform to the contour of the batteries, the upper strips being removable to permit access to said batteries. Figs. 4, 5 and 6 also illustrate a locomotor composed of advance and rear sections flexibly connected together by a pivotal pin 30, such a motor being particularly applicable for use in conduits having comparatively sharp turns. In Figs. 7 and 8 we have shown a locomotor constructed practically the same as that illustrated in Figs. 4 and 5 with the exception that it is rigid throughout, and is provided with a reel 31 at its rear end extending lengthwise thereof and adapted to carry the cord by which a stronger cord or wire is drawn through the conduit.

What we claim is:—

1. A locomotor for use in conduits, comprising a frame, driving means, a source of electric energy carried by the frame and connected to the driving means, and a spring-pressed switch between the source of electric energy and driving means, the switch being normally held out of position to close the circuit and projecting from the frame and being adapted to be forced and held in position to close the circuit by the wall of the conduit in which the locomotor is traveling.

2. A locomotor for use in conduits, comprising a frame, a motor, a source of electric energy, a circuit connecting the motor and the source of electric energy, and a switch-member at the forward end of the frame normally out of position to close the circuit, and movable into such position by engagement with the wall of the conduit, substantially as and for the purpose described.

3. A locomotor for use in conduits, comprising a frame, a motor, a battery, and a movable member in circuit with the battery and motor and having means for making and breaking electrical contact and also having a curved face for engaging the inner face of the conduit, substantially as and for the purpose specified.

4. A locomotor for use in conduits, comprising a tubular frame of conducting substance having a terminal, a motor, the poles of the motor being connected respectively to the frame and the terminal, batteries for the motor supported in the tubular frame, one in advance of the other, each battery having its terminals located at opposite ends thereof, and the positive terminal of one battery being in direct contact with the negative terminal of the adjacent battery, and one terminal of one end battery being in direct contact with the first-mentioned terminal, a detachable closure for the tubular frame, a terminal supported by the closure and electrically disconnected therefrom, said terminal being in electrical connection with a terminal of the other end battery, and a yielding bow-shaped member having its advance end fixed and connected to the last-mentioned terminal, and its rear end movable into and out of engagement with the frame, substantially as and for the purpose set forth.

5. A locomotor for use in conduits, comprising a frame of conducting material and having a transverse wall, a motor, a terminal supported by the transverse wall and electrically disconnected therefrom, a battery having one terminal in electrical connection with the first-mentioned terminal, a second terminal supported by the frame and electrically disconnected therefrom, the last named terminal being in electrical connection with the other terminal of the battery, and a movable switch-member between the frame and the last-mentioned terminal supported by the frame, substantially as and for the purpose specified.

6. A locomotor for use in conduits, comprising a frame of conducting material and including two members detachably secured together, one having a transverse wall, and the other being tubular and projecting from the transverse wall, a motor, a terminal supported by the transverse wall and electrically disconnected therefrom, a battery within the tubular frame-member having one terminal in electrical connection with the first-mentioned terminal, a closure for the free end of the tubular frame-member, a terminal supported by the closure and electrically disconnected therefrom, said terminal being in electrical connection with the other terminal of the battery, and a movable switch-member between the frame and the last-mentioned terminal, substantially as and for the purpose described.

7. A locomotor for use in conduits, comprising a frame, a motor, a source of electric energy connected to the motor, and means for controlling the operation of the motor, said means including a switch-member, and a cord connected to the switch-member for operating the switch from the outside of the conduit, substantially as and for the purpose set forth.

8. A locomotor for use in conduits, comprising a frame, driving means, a source of electric energy, a switch-member in circuit between the driving means and the source of electric energy, said switch-member being normally in position to break the circuit and engaging the wall of the conduit to close the circuit when the locomotor is in operative position, a second switch-member in circuit between the driving means and the source of electric energy, and means connected to the second switch-member for withdrawing the same from operative position, substantially as and for the purpose described.

9. A locomotor for use in conduits, comprising a cylindrical frame, a ring encircling the frame and having trunnions, and wheels journaled on the trunnions, substantially as and for the purpose described.

10. A locomotor for use in conduits, comprising a cylindrical frame, a split ring encircling the frame and having trunnions, means for clamping the split ring to the frame, and wheels journaled on the trunnions, substantially as and for the purpose specified.

11. A locomotor for use in conduits, comprising a frame, consisting of sections flexibly connected together, wheels supporting the sections of the frame, a motor, and a source of electric energy, carried by the frame, the motor being connected to some of said wheels.

In testimony whereof, we have hereunto signed our names in the presence of two attesting witnesses, at Syracuse, in the county of Onondaga, in the State of New York, this 7th day of August, 1906.

GEORGE G. FRYER.
EMIL PFLEIDERER.

Witnesses:
   J. M. FLANNERY,
   W. E. HOPTON.